US010782563B2

(12) United States Patent
Lee et al.

(10) Patent No.: US 10,782,563 B2
(45) Date of Patent: Sep. 22, 2020

(54) STEREOSCOPIC REFLECTION PATTERN, BACKLIGHT UNIT, DISPLAY DEVICE

(71) Applicant: LG Display Co., Ltd., Seoul (KR)

(72) Inventors: Suhun Lee, Gyeonggi-do (KR); SangChul Ryu, Gyeongsangbuk-do (KR); DongSeok Lee, Gyeonggi-do (KR); MyungJoon Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/543,958

(22) Filed: Aug. 19, 2019

(65) Prior Publication Data

US 2020/0089055 A1    Mar. 19, 2020

(30) Foreign Application Priority Data

Sep. 17, 2018    (KR) .......................... 10-2018-0110644

(51) Int. Cl.
    *G02F 1/13357* (2006.01)
(52) U.S. Cl.
    CPC .. *G02F 1/133605* (2013.01); *G02F 1/133603* (2013.01); *G02F 2001/133614* (2013.01)
(58) Field of Classification Search
    CPC ......... G02F 1/133605; G02F 1/133603; G02F 2001/133614
    See application file for complete search history.

(56) References Cited

U.S. PATENT DOCUMENTS

| 9,904,105 | B2 * | 2/2018 | Ma ..................... G02F 1/133606 |
| 10,613,383 | B2 * | 4/2020 | Kim ....................... F21V 11/16 |
| 2003/0165017 | A1 | 9/2003 | Amitai | |
| 2011/0051397 | A1 * | 3/2011 | Bae ..................... G02B 6/0078 362/97.1 |
| 2011/0249215 | A1 * | 10/2011 | Jung ................. G02F 1/133611 349/61 |
| 2012/0170253 | A1 * | 7/2012 | Park ................... G02F 1/133605 362/97.1 |
| 2012/0218752 | A1 * | 8/2012 | Sumitani ........... G02F 1/133605 362/235 |
| 2014/0204575 | A1 * | 7/2014 | Jo ..................... G02F 1/133555 362/235 |
| 2016/0363272 | A1 * | 12/2016 | Chang ............... G02F 1/133609 |

(Continued)

OTHER PUBLICATIONS

Combined Search and Examination Report dated Feb. 20, 2020 issued in corresponding United Kingdom Patent Application No. 1912466.8 (5 pages).

*Primary Examiner* — Mariceli Santiago
(74) *Attorney, Agent, or Firm* — Polsinelli PC

(57) ABSTRACT

A stereoscopic reflection pattern includes a first reflection pattern including a first portion facing the light source and having a first reflectivity with respect to the light having the first wavelength band, and a second portion disposed adjacent to the first portion and having a second reflectivity with respect to the light having the first wavelength band, and the a second reflectivity being lower than the first reflectivity, and a second reflection pattern disposed between the plurality of light sources and the first reflection pattern, at least partially corresponding to the second portion of the first reflection pattern and having a third reflectivity with respect to the light in the first wavelength band which is higher than the second reflectivity.

20 Claims, 12 Drawing Sheets

(56) References Cited

U.S. PATENT DOCUMENTS

2017/0276945 A1 9/2017 Yoshida et al.
2018/0023784 A1* 1/2018 Tamura ............. G02F 1/133602
362/235

* cited by examiner

<Reflection Pattern Transmittance Graph>

STEREOSCOPIC REFLECTION PATTERN, BACKLIGHT UNIT, DISPLAY DEVICE

CROSS REFERENCE TO RELATED APPLICATION

This application claims priority from Korean Patent Application No. 10-2018-0110644, filed on Sep. 17, 2018, which is hereby incorporated by reference in its entirety for all purposes as if fully set forth herein.

BACKGROUND

Field of the Disclosure

The present disclosure relates to a stereoscopic reflection pattern, a backlight unit and a display device.

Description of the Background

As the information society develops, the demand for display devices for displaying images is increasing in various forms. Various types of display devices such as a liquid crystal display device (LCD), and an organic light emitting display device (OLED) have been used for this purpose.

This display device includes a display panel in which a gate line, a data line, a sub-pixel, and the like are arranged, a gate driving circuit for driving the gate line, a data driving circuit for driving the data line. The display device can display an image according to the image data by controlling the brightness represented by each subpixel.

Here, in each sub-pixel, a liquid crystal or a light emitting element emitting light by itself may be disposed depending on the type of the display device.

The liquid crystal display device in which the liquid crystal is disposed in the subpixel includes a backlight unit for supplying light to the display panel.

Therefore, in the case that the display device includes such a backlight unit, there may be a difficulty in reducing the thickness of the display device. Further, if the thickness of the backlight unit is reduced in order to reduce the thickness of the display device, there may be a problem that the image quality can be lowered or the light efficiency can be lowered due to reduction of the optical gap.

SUMMARY

The present disclosure is to provide a stereoscopic reflection pattern, a backlight unit, and a display device including the same, which can reduce the thickness of the backlight unit included in the display device and prevent degradation of image quality.

Additionally, the present disclosure is to provide a stereoscopic reflection pattern, a backlight unit, and a display device including the same, which can prevent degradation of image quality and improve the efficiency of light supplied to the display panel by the backlight unit.

In accordance with an aspect of the present disclosure, there may be provided with a display device including a display device comprising a display panel; and a backlight unit supplying light to the display panel from a lower portion of the display panel, wherein the backlight unit includes, a plurality of light sources emitting light having a first wavelength band, a first reflection pattern including a first portion facing the light source and having a first reflectivity with respect to the light having the first wavelength band, and a second portion disposed adjacent to the first portion and having a second reflectivity with respect to the light having the first wavelength band, and the a second reflectivity being lower than the first reflectivity, and a second reflection pattern disposed between the plurality of light sources and the first reflection pattern, at least partially corresponding to the second portion of the first reflection pattern and having a third reflectivity with respect to the light in the first wavelength band which is higher than the second reflectivity.

In accordance with another aspect of the present disclosure, there may be provided with a backlight unit comprising a plurality of light sources emitting light having a first wavelength band; a first reflection pattern including a first portion facing the light source and having a first reflectivity with respect to the light having the first wavelength band, and a second portion disposed adjacent to the first portion and having a second reflectivity with respect to the light having the first wavelength band, and the a second reflectivity being lower than the first reflectivity, and a second reflection pattern disposed between the plurality of light sources and the first reflection pattern, at least partially corresponding to the second portion of the first reflection pattern and having a third reflectivity with respect to the light in the first wavelength band which is higher than the second reflectivity.

In accordance with a further aspect of the present disclosure, there may be provided with a stereoscopic reflection pattern including a first reflection pattern including a first portion facing the light source and having a first reflectivity with respect to the light having the first wavelength band, and a second portion disposed adjacent to the first portion and having a second reflectivity with respect to the light having the first wavelength band, and the a second reflectivity being lower than the first reflectivity, and a second reflection pattern disposed between the plurality of light sources and the first reflection pattern, at least partially corresponding to the second portion of the first reflection pattern and having a third reflectivity with respect to the light in the first wavelength band which is higher than the second reflectivity.

According to the aspects of the present disclosure, it is possible to reduce the loss of light emitted from the light source while preventing deterioration of image quality by disposing the stereoscopic reflection pattern having a high reflectivity on a light source.

According to the aspects of the present disclosure, the light reflected by the stereoscopic reflection pattern is constructively interfered and supplied to the display panel, thereby preventing the dark portion from appearing between the light sources and improving the overall luminance of the backlight unit According to the aspects of the present disclosure, the light efficiency of the backlight unit can be further improved by disposing a pattern having a reflection characteristic for light directed to the opposite side of the display panel in an area where the stereoscopic reflection pattern is not disposed.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
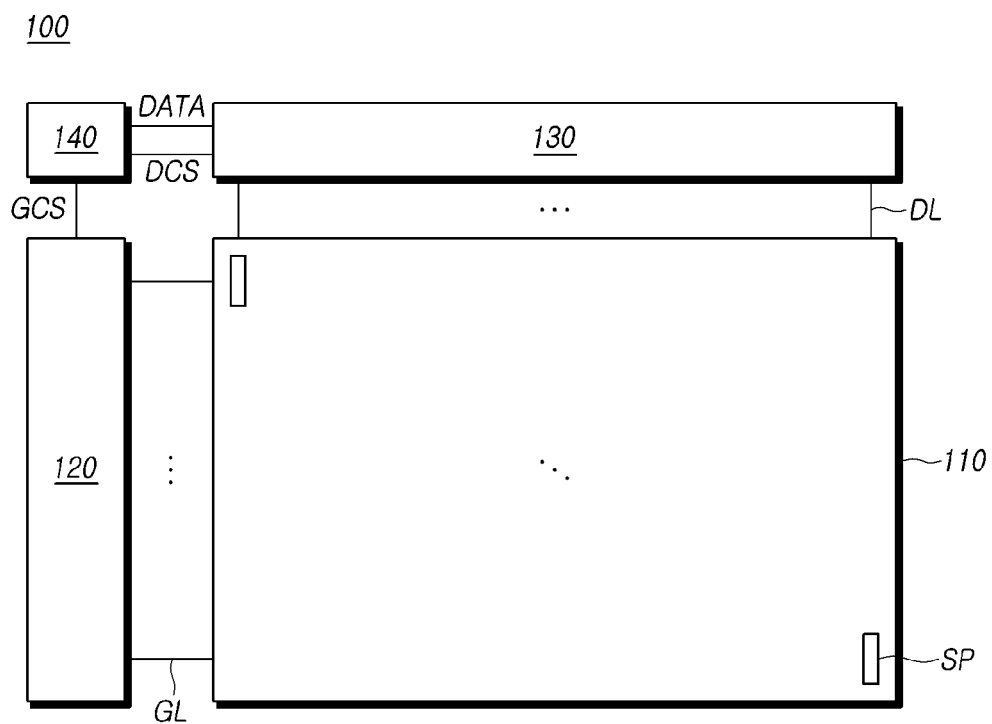
FIG. 1 is a diagram illustrating a schematic configuration of the display device according to aspects of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram illustrating a schematic configuration of the display device 100 according to aspects of the present disclosure.

Referring to FIG. 1, the display device 100 according to the aspects of the present disclosure may include a display panel 110 having a plurality of sub pixels (SP) arranged therein, a gate driving circuit 120 for driving the display panel 110, a data driving circuit 130, a controller 140, and the like.

A plurality of gate lines (GL) and a plurality of data lines (DL) are arranged in the display panel 110 and subpixels (SP) are arranged in the area in which the gate lines (GL) and the data lines (DL) intersect each other.

The gate driving circuit 120 may be controlled by the controller 140 and may sequentially output a scan signal to the plurality of gate lines (GL) arranged on the display panel 110 to control the driving timing of the plurality of subpixels (SP).

The gate driving circuit 120 may include at least one gate driver integrated circuit (GDIC), and may be located on one side or both sides of the display panel 110 according to the driving manner. Alternatively, the gate driving circuit 120 may be embedded in a bezel region of the display panel 110 and implemented in a GIP (Gate In Panel) form.

The data driving circuit 130 may receive the image data from the controller 140 and may convert the image data into an analog data voltage. The data voltages may be outputted to the respective data lines (DL) in accordance with the timing of the scan signals applied through the gate lines (GL) so that each subpixel (SP) expresses the brightness according to the image data.

The data driving circuit 130 may include one or more source driver integrated circuits (SDICs).

The controller 140 may supply various control signals to the gate driving circuit 120 and the data driving circuit 130 and may control the operations of the gate driving circuit 120 and the data driving circuit 130.

The controller 140 may control the gate driving circuit 120 to output the scan signal in accordance with the timing to be implemented in each frame and may convert the image data received from the outside in accordance with the data signal format used by the data driving circuit 130, and may output the converted image data to the data driving circuit 130.

The controller 140 may receive various timing signals including the vertical synchronization signal (Vsync), the horizontal synchronization signal (Hsync), the input data enable signal (DE) and the clock signal (CLK) from the outside (e.g., the host system) together with the image data.

The controller 140 may generate various control signals using timing signals received from the outside and may output the control signals to the gate driving circuit 120 and the data driving circuit 130.

For example, in order to control the gate driving circuit 120, the controller 140 may output various gate control signals (GCS) including a gate start pulse (GSP), a gate shift clock (GSC), a gate output enable signal (GOE), and the like.

Here, the gate start pulse (GSP) may control the operation start timing of one or more gate driver integrated circuits constituting the gate driving circuit 120. The gate shift clock (GSC) is a clock signal commonly input to one or more gate driver integrated circuits, and controls the shift timing of the scan signal. The gate output enable signal (GOE) may specify the timing information of one or more gate driver integrated circuits.

In addition, in order to control the data driving circuit 130, the controller 140 may outputs various data control signals (DCS) including a source start pulse (SSP), a source sampling clock (SSC), and a source output enable signal (SOE).

Here, the source start pulse (SSP) controls the data sampling start timing of one or more source driver integrated circuits constituting the data driving circuit 130. The source sampling clock (SSC) is a clock signal for controlling sampling timing of data in each of the source driver integrated circuits. The source output enable signal (SOE) controls the output timing of the data driving circuit 130.

The display device 100 may include a power management integrated circuit (not shown) for supplying various voltages or currents to the display panel 110, the gate driving circuit 120, the data driving circuit 130, and for controlling various voltages or currents to be supplied.

Each subpixel (SP) may be defined by the intersection of the gate line (GL) and the data line (DL), and the liquid crystal or the light emitting element may be disposed depending on the type of the display device 100.

For example, in the case that the display device 100 is a liquid crystal display device, the display device 100 may include a light source device such as the backlight unit for emitting light to the display panel 110, and the liquid crystal may be disposed in the subpixel (SP) of the display panel 110. In addition, it is possible to display an image with the brightness according to the image data by adjusting the arrangement of the liquid crystal by the electric field formed as the data voltage is applied to each subpixel (SP).

Figure 2:
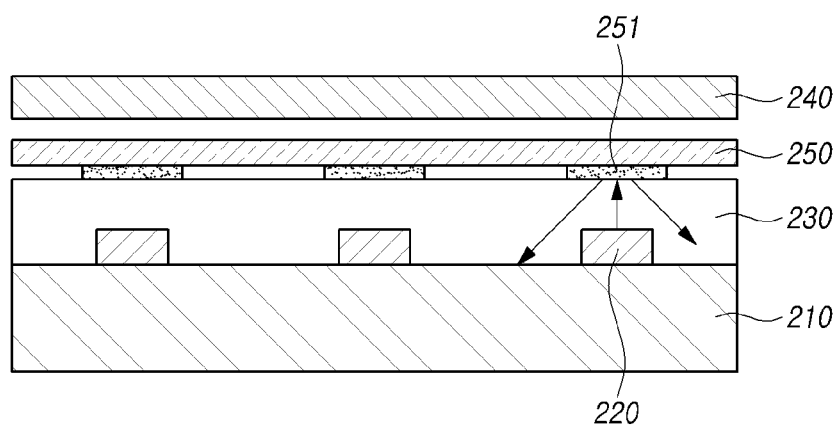
FIG. 2 is a diagram illustrating an example of the structure of the backlight unit included in the display device according to aspects of the present disclosure.

FIG. 2 is a diagram illustrating an example of the structure of the backlight unit included in the display device 100 according to aspects of the present disclosure.

Referring to FIG. 2, the backlight unit may include a light source 220 for supplying light to the display panel 110 and various optical members disposed between the light source 220 and the display panel 110. In addition, the backlight unit may further include a cover bottom (not shown) for accommodating the light source 220 and the optical members.

The light source 220 may be mounted on the printed circuit board 210 and may be a light emitting diode (LED) which emits light in the first wavelength band. Here, the light in the first wavelength band may be, for example, blue light.

In addition, by using a mini light emitting diode or a micro light emitting diode having a small size as the light source 220, it is possible to reduce the thickness of the backlight unit and to reduce the gap between the light sources 220 so as to improve the image quality and brightness of the backlight unit.

A reflection plate (or a reflection sheet; not shown) for increasing the efficiency of light emitted from the light source 220 may be disposed on a lower portion or a side portion of the light source 220.

For example, the reflection plate, for example, may be disposed between the light source 220 and the printed circuit board 210. However, in the case that the size of the light source 220 is reduced, the reflection plate may be disposed on at least a part of the area on the printed circuit board 210 where the light source 220 is not disposed.

Alternatively, the light emitted from the light source 220 may be reflected on the upper surface of the printed circuit board 210 and may be directed to the display panel 110 by applying a material having a high reflectivity such as white ink on the printed circuit board 210.

An adhesive material 230 such as silicone, resin, or the like may be disposed on the light source 220. The plurality of optical members positioned on the light source 220 can be attached and disposed on the adhesive material 230 by arranging the adhesive material 230 on the light source 220.

A color conversion sheet 240 for converting the wavelength of light emitted from the light source 210 may be disposed on the adhesive material 230.

For example, the color conversion sheet 240 may emit light in at least one of the second wavelength band and the third wavelength band in response to light in the first wavelength band emitted from the light source 210.

Here, the light in the second wavelength band may be green light, and the light in the third wavelength band may be red light.

Therefore, the color conversion sheet 240 emits the light of the second wavelength band and the light of the third wavelength band in response to the light of the first wavelength band emitted from the light source 220, so that white light may be supplied to the display panel 110.

A diffusion plate (or diffusion sheet, not shown) for diffusing the light emitted from the light source 220 may be disposed between the color conversion sheet 240 and the light source 220.

In addition, a light shielding pattern sheet 250 for improving the image quality may be disposed between the color conversion sheet 240 and the light source 220.

The light shielding pattern sheet 250 may be disposed between the diffusion plate and the light source 220 in the case that the diffusion plate is disposed.

The light shielding pattern sheet 250 may be disposed on the light source 220, and may include a plurality of light shielding patterns 251 disposed at positions corresponding to the light sources 220. The light shielding pattern 251 may be, for example, a predetermined pattern formed of white ink made of $TiO_2$.

Since the light shielding pattern 251 is disposed at a position corresponding to the light source 220, the light emitted from the light source 220 may be blocked in an area where the light intensity is high. Therefore, it is possible to prevent mura phenomenon appearing at a position on which where the light source 220 is disposed in the backlight unit and to improve the image quality of the backlight unit.

In this manner, the image quality of the backlight unit can be improved by disposing the light shielding pattern sheet 250 on the light source 220. However, the loss of light may occur due to the low reflectivity of the light shielding pattern 251. This loss of light may lower the brightness of the backlight unit.

Aspects of the present disclosure may provide the backlight unit capable of improving image quality and improving brightness by arranging the reflection pattern having a higher reflectivity than the light shielding pattern 251 and having a stereoscopic structure on the light source 220.

Figure 3:
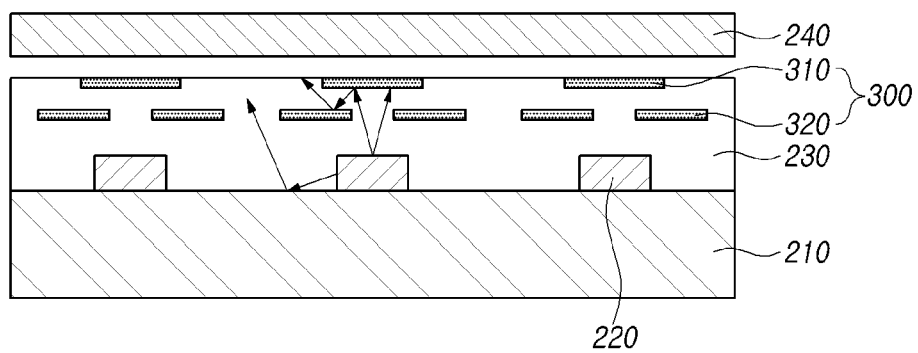
FIG. 3 is a diagram illustrating another example of the structure of the backlight unit according to the aspects of the present disclosure.

FIG. 3 is a diagram illustrating another example of the structure of the backlight unit according to the aspects of the present disclosure.

Referring to FIG. 3, the backlight unit may include the printed circuit board 210 and the plurality of light sources 220 mounted on the printed circuit board 210. Here, the light source 220 may emit light in the first wavelength band.

The adhesive material 230 may be disposed on the plurality of light sources 220 and the color conversion sheet 240 may be disposed on the adhesive material 230.

Here, a stereoscopic reflection pattern 300 having a high reflection characteristic with respect to light of the first wavelength band may be disposed on the light source 220.

The stereoscopic reflection pattern 300 may include a first reflection pattern 310 disposed on the light source 220 and spaced apart from the light source 220, and a second reflection pattern 310 disposed between the light source 220 and the first reflection pattern 310 and having an open portion corresponding to the light source 220.

The first reflection pattern 310 is located on the light source 220 and may have an area larger than that of the upper surface of the light source 220. The first reflection pattern 310 may have a high reflection characteristic (for example, a reflectivity of 90%) for the light of the first wavelength band emitted from the light source 220 and may reflect the light emitted from the light source 220. Therefore, it is possible to prevent the generation of Mura from occurring at a position corresponding to the light source 220.

In addition, the light reflected by the first reflection pattern 310 may be reflected by the second reflection pattern 320 and directed toward the display panel 110 so as to reduce the loss of light and to increase the amount of light supplied to the display panel 110.

The second reflection pattern 320 may be located between the light source 220 and the first reflection pattern 310 and may have a high reflection characteristic (for example, a reflectivity of 90%) for light in the first wavelength band similar to the first reflection pattern 310.

The second reflection pattern 320 may be disposed such that a portion corresponding to the light source 220 is open, and may be disposed to overlap with the outer periphery of the first reflection pattern 310.

Accordingly, the light emitted from the light source 220 may be reflected by the second reflection pattern 320 located under the first reflection pattern 310, or may pass through the open portion of the second reflection pattern 320 and may be reflected by the first reflection pattern 310. Therefore, it is possible to prevent the occurrence of Mura at a position corresponding to the light source 220.

The light reflected by the first reflection pattern 310 may be re-reflected by the second reflection pattern 320 and may be supplied to the display panel 110.

As described above, the first reflection pattern 310 for blocking the light in the vertical direction of the light source 220 while having a high reflection characteristic for the light of the first wavelength band emitted from the light source 220, and the second reflection pattern 320 for blocking light and re-reflecting the light while having a high reflection characteristic with respect to the light of the first wavelength band emitted from the light source 220 are arranged in three dimensions. Thereby, it is possible to provide a highly efficient backlight unit which improves image quality and reduces light loss.

At this case, the brightness of the peripheral portion of the first reflection pattern 310 may be increased by the light re-reflected by the second reflection pattern 320, or the brightness of the region between the light sources 220 may be relatively lowered.

Therefore, in the aspects of the present disclosure, a portion of the first reflection pattern 310 may be configured as a pattern having a different reflectivity. Thus, there may be provided with the stereoscopic reflection pattern 300 and the backlight unit in which the light path is controlled between the first reflection pattern 310 and the second reflection pattern 320 to further improve image quality and light efficiency.

Figure 4:
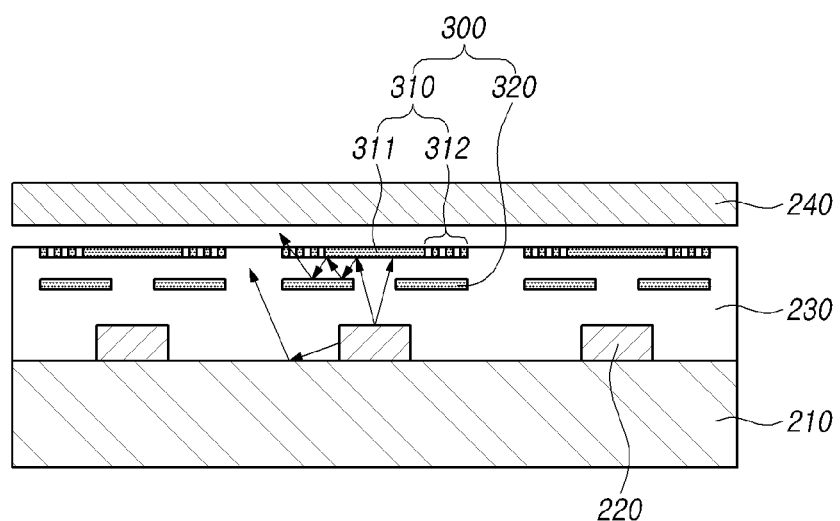
FIG. 4 is a diagram illustrating yet another example of the structure of the backlight unit according to the aspects of the present disclosure.

FIG. 4 is a diagram illustrating yet another example of the structure of the backlight unit according to the aspects of the present disclosure.

Referring to FIG. 4, the backlight unit may include the printed circuit board 210 and a plurality of light sources 220 mounted on the printed circuit board 210 and emitting light in the first wavelength band.

The adhesive material 230 may be disposed on the light source 220, and the color conversion sheet 240 may be disposed on the adhesive material 230 to emit light in at least a part of wavelength bands of the second wavelength band and the third wavelength band in response to light in the first wavelength band.

The stereoscopic reflection pattern 300 including the first reflection pattern 310 and the second reflection pattern 320 may be disposed on the light source 220.

The stereoscopic reflection pattern 300 may include the first reflection pattern 310 disposed apart from the light source 220, and the second reflection pattern 320 disposed between the light source 220 and the first reflection pattern 310.

The stereoscopic reflection pattern 300 may be formed by first arranging the adhesive material 230 on the light source 220, forming the second reflection pattern 320, secondarily placing the adhesive material 230 on the second reflection pattern 320, and forming the first reflection pattern 310.

The first reflection pattern 310 may include a first portion 311 disposed at a position corresponding to the light source 220 and having a first reflectivity (for example, 90%) for light in the first wavelength band, and may include a second portion 312 disposed outside of the first portion 311 and having a second reflectivity (e.g., 50%) that is lower than the first reflectivity for light in the first wavelength band.

The second reflection pattern 320 may be disposed between the light source 220 and the first reflection pattern 310, and may be disposed in a region corresponding to the second portion 312 of the first reflection pattern 310. The second reflection pattern 320 may be disposed so as to overlap the boundary between the first portion 311 and the second portion 312 of the first reflection pattern 310.

Therefore, the second reflection pattern 320 may be formed such that a portion corresponding to the central portion of the first portion 311 of the first reflection pattern 310 is opened. In addition, the second reflection pattern 320 may be disposed in an area corresponding to the outer portion of the first portion 311 of the first reflection pattern 310 and the second portion 312.

The second reflection pattern 320 may have a third reflectivity (e.g., 90%) higher than the second reflectivity of the second portion 312 of the first reflection pattern 310. The third reflectivity may be the same as the first reflectivity of the first portion 311 of the first reflection pattern 310.

Since the light emitted from the light source 220 is reflected by the first portion 311 of the first reflection pattern 310, the Mura may not occur at a position corresponding to the light source 220.

The light reflected by the first portion 311 of the first reflection pattern 310 is reflected by the second reflection pattern 320 located below the first reflection pattern 310, so that the amount of light supplied to the display panel 110 can be increased.

At this case, the light reflected by the second reflection pattern 320 may be reflected again by the second portion 312 of the first reflection pattern 310.

Here, the second portion 312 of the first reflection pattern 310 may have the reflectivity lower than that of the first portion 311, and a part of the light reflected by the second reflection pattern 320 may travel toward the display panel 110 in a region corresponding to the second portion 312.

A part of the light may be continuously reflected between the second portion 312 of the first reflection pattern 310 and the second reflection pattern 320 and may travel toward the display panel 110 in an area between adjacent first reflection patterns 310, that is, an area between the light sources 220.

At this case, the interval or the distance between the first reflection pattern 310 and the second reflection pattern 320 may be set so that the constructive interference of light in the first wavelength band can be generated. Thus, the intensity of light traveling to the area between the light sources 220 can be increased.

The light emitted from the light source 220 and reflected from the lower surface of the second reflection pattern 320 may be reflected by the upper surface of the printed circuit board 210 or the reflection plate disposed on the printed circuit board 210. As a result, the intensity of light traveling to the area between the light sources 220 may be increased.

Therefore, the first portion 311 of the first reflection pattern 310 and the second reflection pattern 320 having a high reflectivity can prevent the occurrence of the Mura due to the concentration of the light at the position corresponding to the light source 220. Also, loss of light supplied to the display panel 110 may be prevented, and the light efficiency can be increased.

The light reflected by the first portion 311 of the first reflection pattern 310 or the light reflected by the lower surface of the second reflection pattern 320 may be supplied to a region where the amount of light is relatively small. As a result, it is possible to provide a backlight unit that provides overall uniform brightness and improved image quality, and the display device 100 including this backlight unit.

Figure 5:
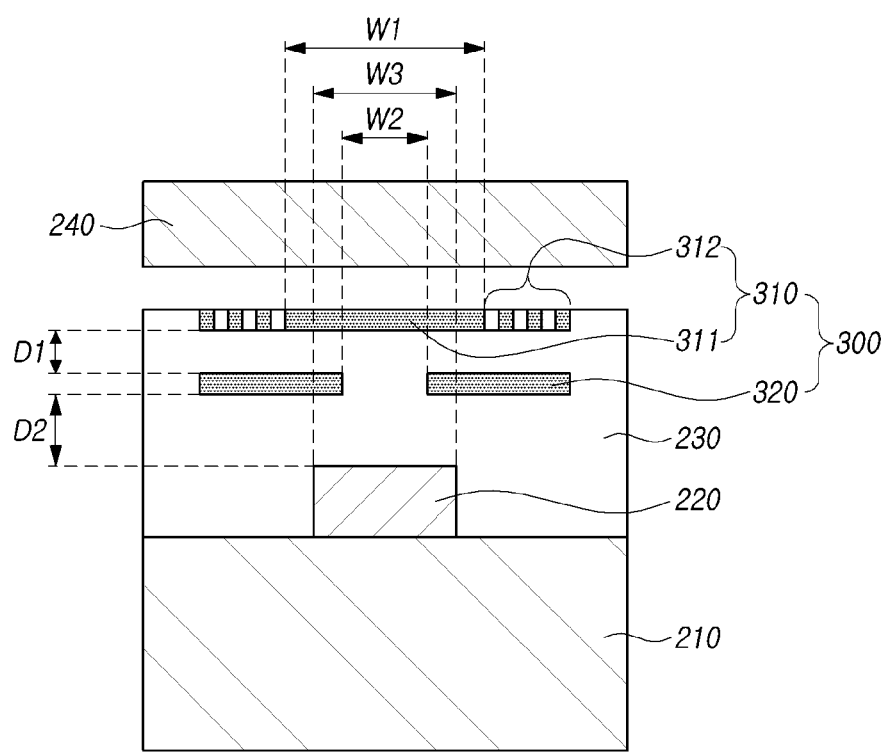
FIG. 5 a diagram illustrating an example of an arrangement structure of the light source and the stereoscopic reflection pattern in the backlight unit shown in FIG. 4.

FIG. 5 a diagram illustrating an example of a specific arrangement structure of the light source 220 and the stereoscopic reflection pattern 300 in the backlight unit shown in FIG. 4.

Referring to FIG. 5, the stereoscopic reflection pattern 300 disposed on the light source 220 may include the first reflection pattern 310 located on the light source 220 and including the first portion 311 and the second portion 312, and the second reflection pattern 320 positioned between the light source 220 and the first reflection pattern 310.

The first portion 311 of the first reflection pattern 310 may have the first reflectivity for light of the first wavelength band emitted from the light source 220, and the area of the first portion 311 may be larger than the area of the upper surface of the light source 220.

That is, the width W1 of the first portion 311 of the first reflection pattern 310 may be larger than the width W3 of the upper surface of the light source 220.

Here, the width may mean a diameter depending on the shape of the light source 220 and the first reflection pattern 310, or may mean a length of the longest straight line in the upper surface of the light source 220 or the surface of the first portion 311.

The second portion 312 of the first reflection pattern 310 may be located outside the first portion 310 and may have the second reflectivity that is lower than the first reflectivity for light in the first wavelength band.

The second reflection pattern 320 located under the first reflection pattern 310 may have the third reflectivity higher than the second reflectivity with respect to light in the first wavelength band.

Here, the area of the open portion of the second reflection pattern 320 may be smaller than the area of the upper surface of the light source 220. That is, the width W2 of the open portion of the second reflection pattern 320 may be smaller than the width W3 of the upper surface of the light source 220. In this specification, the open portion of the second reflection pattern 320 may be expressed in the same meaning as a hole.

The second reflection pattern 320 may be arranged to correspond to the second portion 312 of the first reflection pattern 310, and the second reflection pattern 320 may be disposed to correspond to a boundary between the first portion 311 and the second portion 312 of the first reflection pattern 310.

The vertical distance D1 between the first reflection pattern 310 and the second reflection pattern 320 may be smaller than the vertical distance D2 between the second reflection pattern 320 and the light source 220

That is, the first portion 311 of the first reflection pattern 310 which is relatively far from the light source 220, and the second reflection pattern 320 which is disposed relatively close to the light source 220 may be arranged in a form taking into account the diffusion characteristics of light emitted from the light source 220.

The first portion 311 of the first reflection pattern 310 and the second reflection pattern 320 may reflect light emitted in a vertical direction or a diagonal direction close to the vertical direction from the light source 220, thereby preventing the occurrence of the Mura due to the concentration of the light at the position corresponding to the light source 220.

The outline (inner outline or outer outline) of the second reflection pattern 320 disposed so as to correspond to the second portion 312 of the first reflection pattern 310 may coincide with the outline (inner outline or outer outline) of the second portion 312 in the vertical direction.

Alternatively, the outline (inner outline or outer outline) of the second reflection pattern 320 may be located inside the outline (inner outline or outer outline) of the second portion 312 of the first reflection pattern 310. Especially, the inner outline of the second reflection pattern 320 may be located inside the inner outline of the second portion 312 of the first reflection pattern 310. That is, the inner outline of the second reflection pattern 320 may be located inside an outline of the first portion 311 of the first reflection pattern 310.

The light reflected from the lower surface of the first portion 311 of the first reflection pattern 310 may be reflected again between the upper surface of the second reflection pattern 320 and the second portion 312 of the first reflection pattern 310, and may be supplied to an area between the adjacent stereoscopic reflection patterns 300, that is, an area between the light sources 220.

Furthermore, the light reflected from the lower surface of the second reflection pattern 320 may be reflected by the upper surface of the printed circuit board 210 or the reflection plate disposed on the upper surface of the printed circuit board 210, and may be supplied to an area between the light sources 220.

Accordingly, it is possible to reduce the light loss due to the reflection pattern disposed for preventing the occurrence of the Mura, and to make the luminance in the region corresponding to the light source 220 and in the region between the light sources 220 uniform.

Figure 6:
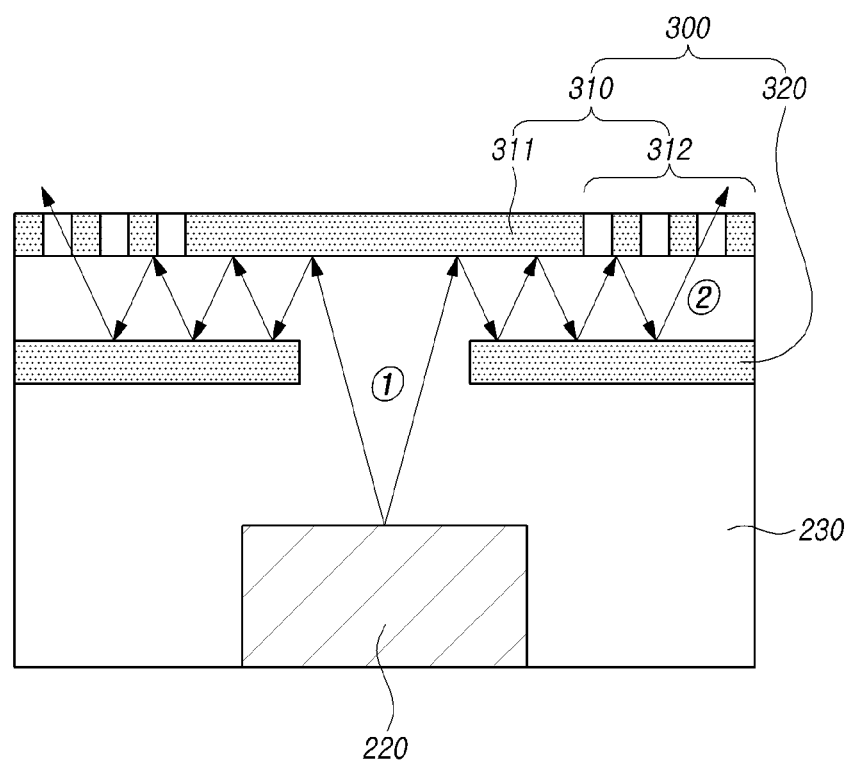
FIG. 6 is a diagram illustrating an example of a light traveling path by the stereoscopic reflection pattern in the backlight unit shown in FIG. 4.

FIG. 6 is a diagram illustrating an example of a light traveling path by the stereoscopic reflection pattern 300 in the backlight unit shown in FIG. 4.

Referring to FIG. 6, the light of the first wavelength band emitted from the light source 220 can be reflected by the first portion 311 of the first reflection pattern 310 (①). Since the first portion 311 of the first reflection pattern 310 has the high reflection characteristic with respect to light in the first wavelength band, loss of light emitted from the light source 220 can be reduced.

The light reflected by the first portion 311 of the first reflection pattern 310 may be reflected between the second reflection pattern 320 and the second portion 312 of the first reflection pattern 310 (②).

In addition, since the reflectivity of the second portion 312 of the first reflection pattern 310 is lower than that of the first portion 311 of the first reflection pattern 310, a part of the light reflected between the second reflection pattern 320 and the second portion 312 of the first reflection pattern 310 may be supplied to the display panel 110 through the second portion 312.

Here, the interval between the first reflection pattern 310 and the second reflection pattern 320 may be designed to generate the constructive interference in consideration of the wavelength of the light emitted from the light source 220.

That is, the interval D1 between the first reflection pattern 310 and the second reflection pattern 320 may be designed to satisfy $2nD1=m\lambda$ in the case that the wavelength of the light emitted from the light source 220 is $\lambda$. Here, n may represent a refractive index, and m may represent an integer.

The intensity of the light reflected between the second portion 312 of the first reflection pattern 310 and the second reflection pattern 320 may be reinforced and may be supplied to the region between the light sources 220.

In order to induce such constructive interference, the second portion 312 of the first reflection pattern 310 may further include a film having a first reflectivity such as the first portion 311 of the first reflection pattern 310, which is disposed in a part of the region corresponding to the second portion 312.

Figure 7:
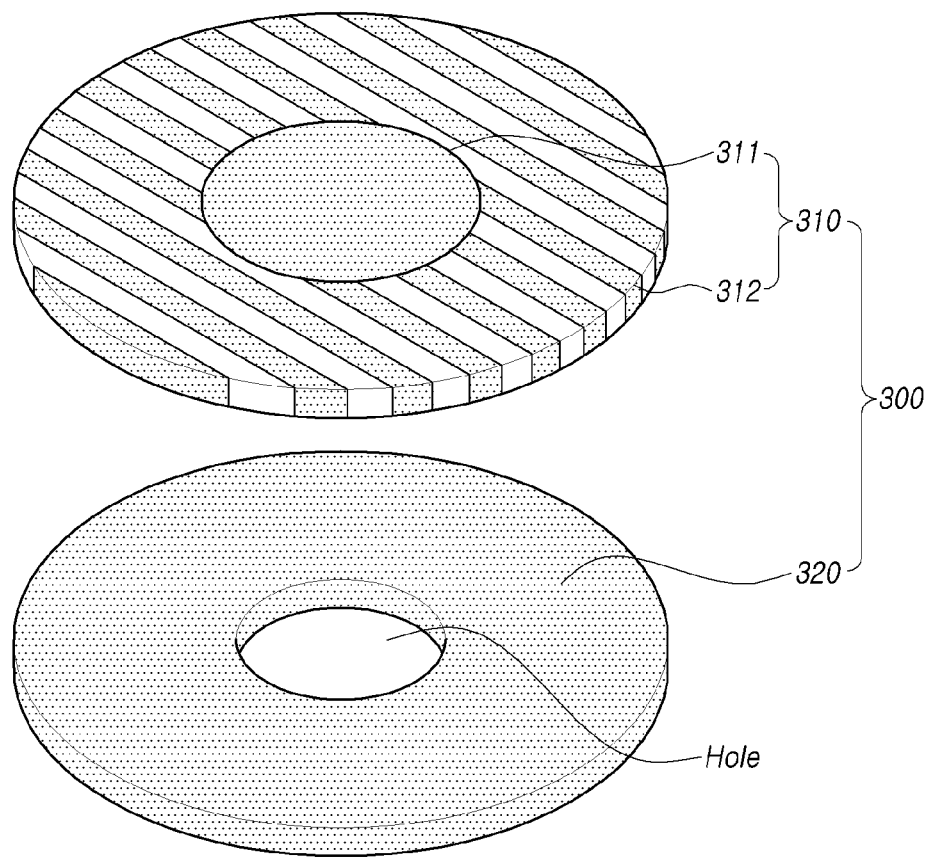
FIG. 7 is a diagram illustrating an example of a structure of the stereoscopic reflection pattern included in the backlight unit shown in FIG. 4.

FIG. 7 is a diagram illustrating an example of a specific structure of the stereoscopic reflection pattern 300 included in the backlight unit shown in FIG. 4.

Referring to FIG. 7, the stereoscopic reflection pattern 300 may include the first reflection pattern 310 including the first portion 311 having a first reflectivity with respect to light in the first wavelength band and the second portion 312 located outside the first portion 311 and having a second reflectivity that is lower than the first reflectivity for light in the first wavelength band. In addition, the stereoscopic reflection pattern 300 may include the second reflection pattern 320 having a third reflectivity higher than the second reflectivity with respect to light in the first wavelength band and having the open portion corresponding to the first portion 311 of the first reflection pattern 310.

Here, the second portion 312 of the first reflection pattern 310 may be constituted such that the film having the first reflectivity with respect to light in the first wavelength band is disposed in a part of the region corresponding to the second portion 312.

That is, the same reflection film as the reflection film constituting the first portion 311 may be disposed in a part of the region corresponding to the second portion 312 of the first reflection pattern 310, and the adhesive material 230 and the like disposed on the light source 220 may be disposed in the remaining region.

Accordingly, the constructive interference of light reflected between the second portion 312 of the first reflection pattern 310 and the second reflection pattern 320 may be induced, and the intensity of the light supplied to the region between the light sources 220 may increase, and a part of light may be supplied to the display panel 110 through the second portion 312 of the first reflection pattern 310.

The second reflectivity of the second portion 312 of the first reflection pattern 310 may be variously implemented by adjusting the area or the ratio of the reflection film disposed in the region corresponding to the second portion 312.

Further, the reflection film constituting the second portion 312 of the first reflection pattern 310 may be arranged in various forms.

Figure 8A:
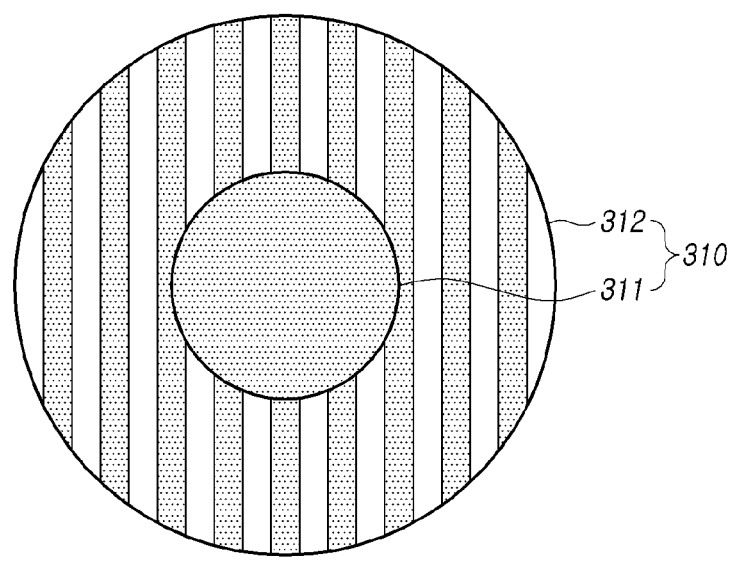
FIGS. 8A and 8B are diagrams illustrating examples of the structure of the first reflection pattern of the stereoscopic reflection pattern shown in FIG. 7.
Figure 8B:
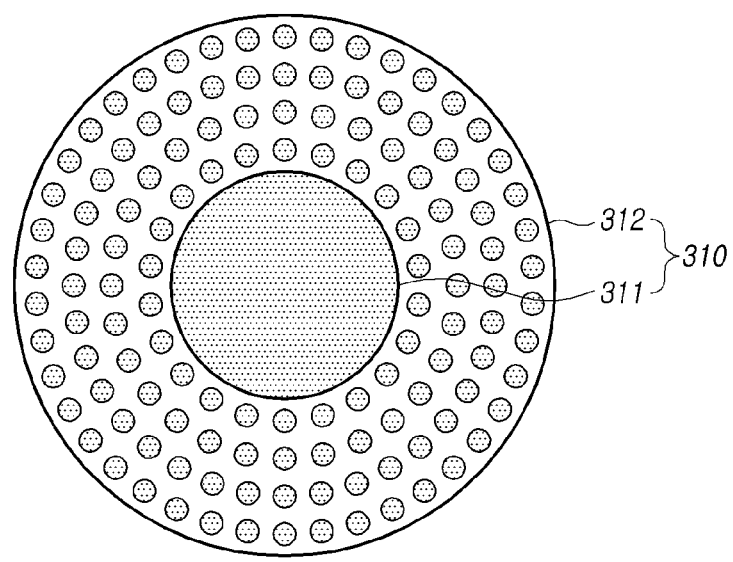

FIGS. 8A and 8B are diagrams illustrating examples of the structure of the first reflection pattern 310 of the stereoscopic reflection pattern 300 shown in FIG. 7.

Referring to FIGS. 8A and 8B, in the first reflection pattern 310 including the first portion 311 and the second portion 312 having different reflectivity, the first portion 311 may be implemented by disposing a film having the first reflectivity the light in the first wavelength band as a whole.

In addition, the second portion 312 may be implemented by partially disposing the film having the first reflectivity with respect to light in the first wavelength band.

As an example, as shown in FIG. 8A, the film having the first reflectivity may be arranged in a straight line form in a part of a region corresponding to the second portion 312 of the first reflection pattern 310.

As another example, the film having the first reflectivity may be arranged in a circle shape in a part of the region corresponding to the second portion 312 of the first reflection pattern 310, as shown in FIG. 8B.

The shape of the film having the first reflectivity disposed in the second portion 312 of the first reflection pattern 310 may be not limited to the above examples. However, in consideration of the light diffusion characteristic, the film having the first reflectivity may be uniformly distributed as shown in FIG. 8B.

Furthermore, although the shape of the first reflection pattern 310 is not limited to the circular shape, in consideration of the diffusion characteristics of the light emitted from the light source 220, the aspects of the present disclosure will be described by exemplifying the case in which the first reflection pattern 310 and the second reflection pattern 320 have both the circular shape or the circle shape.

Figure 9A:
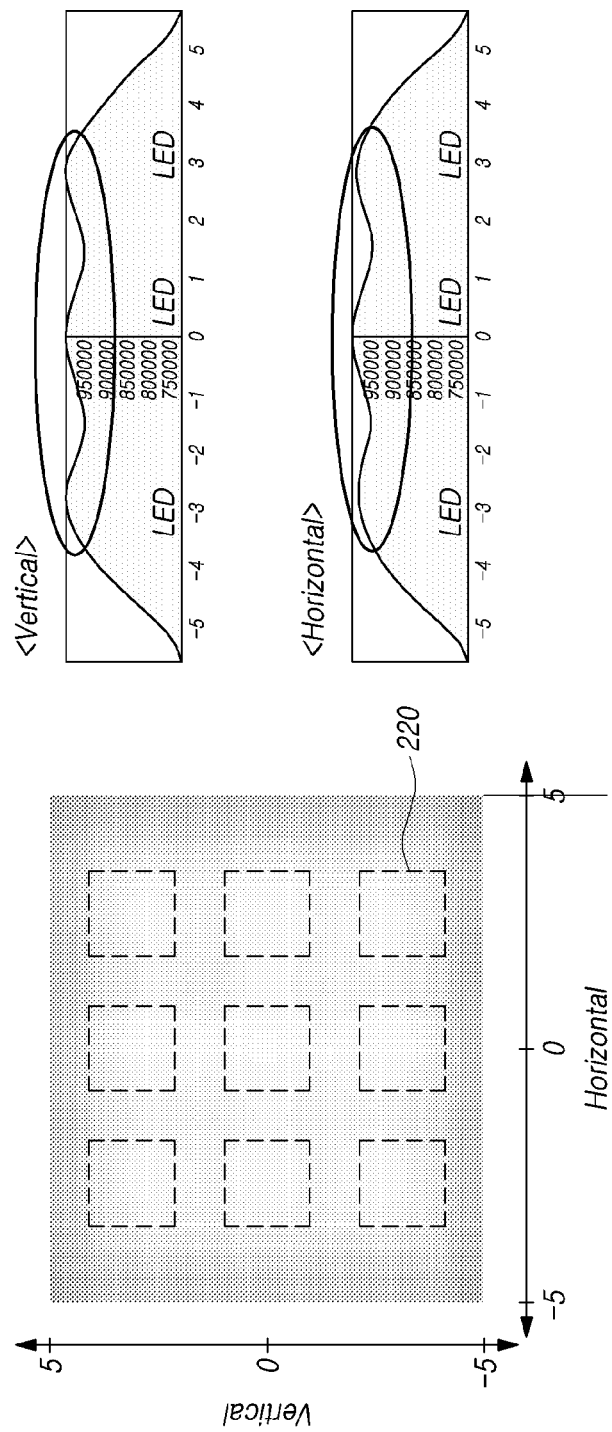
FIGS. 9A and 9B are diagrams illustrating an example in which the luminance represented by the backlight unit including a light shielding pattern and the luminance represented by the backlight unit including the stereoscopic reflection pattern are compared.
Figure 9B:
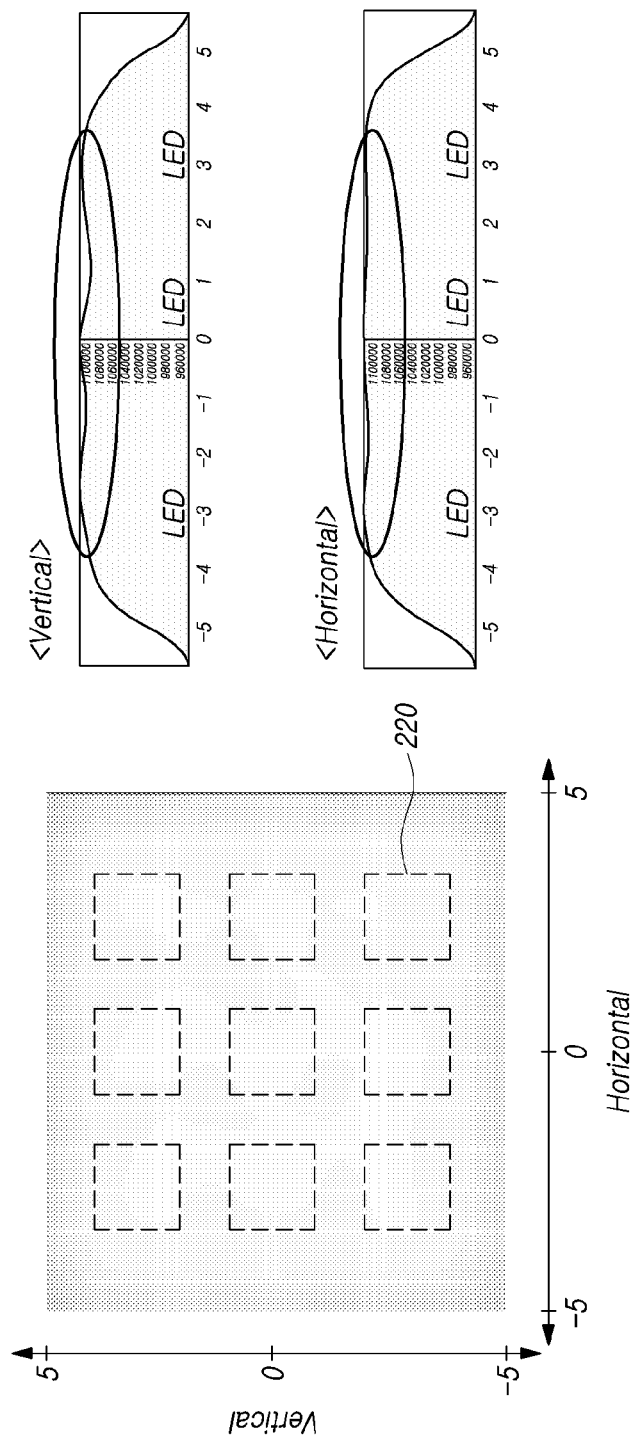

FIGS. 9A and 9B are diagrams illustrating an example in which the luminance represented by the backlight unit including a light shielding pattern 251 and the luminance represented by the backlight unit including the stereoscopic reflection pattern 300 are compared.

FIG. 9A illustrates an example of the luminance or the brightness represented in the case that the light shielding pattern 251 is disposed on the light source 220, and it may be seen that the region between the light sources 220 appears relatively dark.

Alternatively, FIG. 9B illustrates an example of the luminance or the brightness represented in the case that the stereoscopic reflection pattern 300 is disposed on the light source 220. In this case, since the light reflected by the stereoscopic reflection pattern 300 is supplied to the area between the light sources 220, it can be seen that the brightness or the luminance in the area between the light sources 220 is improved and the brightness or the luminance is uniformly displayed as a whole.

That is, according to the aspects of the present disclosure, the stereoscopic reflection pattern 300 including the first reflection pattern 310 and the second reflection pattern 320 is disposed on the light source 220, so that it is possible to provide the backlight unit of high efficiency with improved image quality by improving the light efficiency and the overall luminance uniformity while preventing the occurrence of the Mura at a position corresponding to the light source 220 and to provide the display device 100 including such a backlight unit.

In addition, the light efficiency of the backlight unit may be further increased by disposing the reflection pattern having the reflection characteristic different from that of the stereoscopic reflection pattern 300 in an area where the stereoscopic reflection pattern 300 is not disposed.

Figure 10:
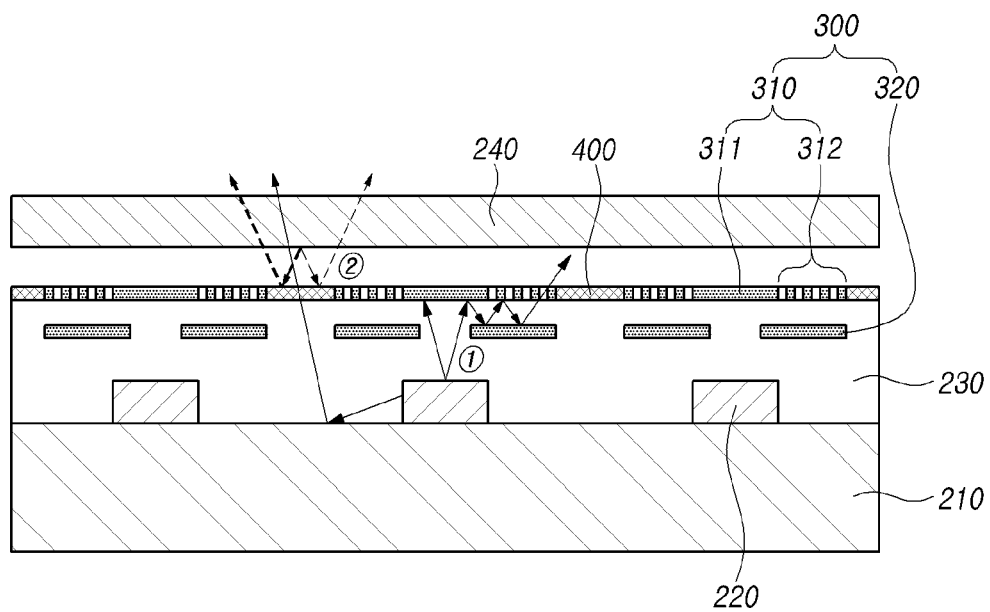
FIG. 10 is a diagram illustrating another example of the structure of the backlight unit according to the aspects of the present disclosure.
Figure 10:
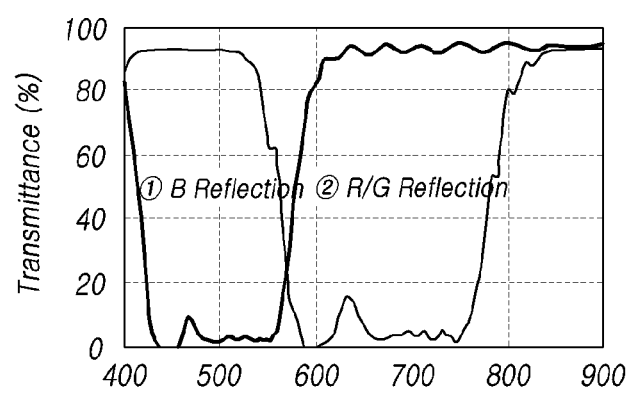

FIG. 10 is a diagram illustrating another example of the structure of the backlight unit according to the aspects of the present disclosure.

Referring to FIG. 10, the backlight unit may include the light source 220 mounted on the printed circuit board 210 and the stereoscopic reflection pattern 300 located on the light source 220. The color conversion sheet 240 emitting light in a different wavelength band in response to light emitted from the light source 220 may be positioned on the stereoscopic reflection pattern 300.

The stereoscopic reflection pattern 300 may include the first reflection pattern 310 located on the light source 220 and the second reflection pattern 320 located between the light source 220 and the first reflection pattern 310.

The first reflection pattern 310 may include the first portion 311 disposed at a position corresponding to the light source 220 and having the first reflectivity for light in a first wavelength band emitted from the light source 220, may include the second portion 312 disposed outside the first portion 311 and having the second reflectivity lower than the first reflectivity for light in the first wavelength band.

The second reflection pattern 320 may be disposed in a region corresponding to the second portion 312 of the first reflection pattern 310 and may have a region corresponding to the light source 220 opened. The second reflection pattern 320 may be disposed so as to overlap the boundary between the first portion 311 and the second portion 312 of the first reflection pattern 310.

The second reflection pattern 320 may have the third reflectivity higher than the second reflectivity for light in the first wavelength band, and the third reflectivity may be equal to the first reflectivity.

This stereoscopic reflection pattern 300 can prevent the occurrence of the Mura at a position corresponding to the light source 220 and can increase the amount of light or intensity of light supplied to the area between the light sources 220 (①)

Here, in the layer in which the first reflection pattern 310 of the stereoscopic reflection pattern 300 is disposed, a third reflection pattern 400 may be disposed in at least a part of the region excluding the region in which the first reflection pattern 310 is disposed.

The third reflection pattern 400 may have a high reflection characteristic with respect to light of at least a part of wavelength bands other than the first wavelength band.

For example, the third reflection pattern 400 may have reflection characteristics for light in the second wavelength band and light in the third wavelength band.

That is, the stereoscopic reflection pattern 300 may provide a reflection characteristic for blue light which is light in the first wavelength band, and the third reflection pattern 400 may provide a reflection characteristic for green light which is light in the second wavelength band and for red light which is light in the third wavelength band.

The light directed to the opposite side of the display panel 110 among the light emitted from the color conversion sheet 240 in response to the light of the first wavelength band emitted from the light source 220 may be reflected by the third reflection pattern 400 (②).

Since the third reflection pattern 400 does not have a reflection characteristic for light in the first wavelength band, the light of the first wavelength band that is reflected by the stereoscopic reflection pattern 300 or the like and supplied to the region between the light sources 220 can be transmitted as it is.

As described above, the light of the second wavelength band and the third wavelength band moving from the color conversion sheet 240 to the opposite side of the display panel 110 may be directed again to the display panel 110. As a result, the loss of light traveling from the light source 220 to the display panel 110 can be minimized.

According to the aspects of the present disclosure described above, the stereoscopic reflection pattern 300 having a high reflection characteristic is arranged on the light source 220 in a structure in consideration of the light diffusion characteristic, so that it is possible to prevent the generation of the Mura at a position corresponding to the light source 220 and to reduce the loss of light.

The first reflection pattern 310 of the stereoscopic reflection pattern 300 may be composed of a first portion 311 and a second portion 312 having different reflectivity, and the light reflected from the lower surface of the second reflection pattern 320 and the light constructively interfered between the first reflection pattern 310 and the second reflection pattern 320 are supplied to the region between the light sources 220, thereby improving the overall luminance uniformity and increasing the light efficiency.

Furthermore, the third reflection pattern 400 having the reflection characteristic for the light directed to the opposite side of the display panel 110 is disposed in the region in which the stereoscopic reflection pattern 300 is not disposed, so that it is possible to provide the backlight unit of high efficiency with improved image quality, and a display device 100 including the backlight unit.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the aspects disclosed in the present disclosure are intended to illustrate the scope of the technical idea of the present disclosure, and the scope of the present disclosure is not limited by the aspect. The scope of the present disclosure shall be construed on the basis of the accompanying claims in such a manner that all of the technical ideas included within the scope equivalent to the claims belong to the present disclosure.

What is claimed is:

1. A display device comprising:
a display panel; and
a backlight unit supplying light to the display panel from a lower portion of the display panel, wherein the backlight unit includes,
a plurality of light sources emitting light having a first wavelength band,
a first reflection pattern including a first portion facing the plurality of light sources and having a first reflectivity with respect to the light having the first wavelength band, and a second portion disposed adjacent to the first portion and having a second reflectivity with respect to the light having the first wavelength band, and the second reflectivity being lower than the first reflectivity, and
a second reflection pattern disposed between the plurality of light sources and the first reflection pattern, at least partially corresponding to the second portion of the first reflection pattern and having a third reflectivity with respect to the light in the first wavelength band which is higher than the second reflectivity.

2. The display device of claim 1, wherein the first reflectivity and the third reflectivity are the same.

3. The display device of claim 1, wherein the first portion of the first reflection pattern is larger than an upper surface of the plurality of light sources.

4. The display device of claim 1, wherein the second reflection pattern having a hole therein, and the hole is smaller than the first portion of the first reflection pattern.

5. The display device of claim 1, wherein the second reflection pattern has one inner end portion which is vertically aligned with an outer end portion of the first portion of the first reflection pattern or is located inside the outer end portion of the first portion of the first reflection pattern.

6. The display device of claim 1, wherein a vertical distance between the first reflection pattern and the second reflection pattern is shorter than a vertical distance between the plurality of light sources and the second reflection pattern.

7. The display device of claim 1, wherein the second portion of the first reflection pattern includes a film with the first reflectivity with respect to the light having the first wavelength band and the film is disposed partially corresponding to the second portion.

8. The display device of claim 1, further comprising a third reflection pattern which is disposed in at least a part of an area where the first reflection pattern is not disposed and having a reflection characteristic of at least a part of wavelength band different from the first wavelength band.

9. A backlight unit comprising:
a plurality of light sources emitting light having a first wavelength band;
a first reflection pattern including a first portion facing the plurality of light sources and having a first reflectivity with respect to the light having the first wavelength band, and a second portion disposed adjacent to the first portion and having a second reflectivity with respect to the light having the first wavelength band, and the second reflectivity being lower than the first reflectivity, and
a second reflection pattern disposed between the plurality of light sources and the first reflection pattern, at least partially corresponding to the second portion of the first reflection pattern and having a third reflectivity with respect to the light in the first wavelength band which is higher than the second reflectivity.

10. The backlight unit of claim 9, wherein the first reflectivity and the third reflectivity are the same.

11. The backlight unit of claim 9, wherein the first portion of the first reflection pattern is larger than an upper surface of the light source.

12. The display device of claim 9, wherein the second reflection pattern having a hole therein, and the hole is smaller than the first portion of the first reflection pattern.

13. The display device of claim 9, wherein the second reflection pattern has one inner end portion which is vertically aligned with an outer end portion of the first portion of the first reflection pattern or is located inside the outer end portion of the first portion of the first reflection pattern.

14. The display device of claim 9, wherein the second portion of the first reflection pattern includes a film with the first reflectivity with respect to the light having the first wavelength band and the film is disposed partially corresponding to the second portion.

15. The backlight unit of claim 9, further comprising a third reflection pattern which is disposed in at least a part of an area where the first reflection pattern is not disposed and having a reflection characteristic of at least a part of wavelength band different from the first wavelength band.

16. A stereoscopic reflection pattern comprising a plurality of light sources emitting light having a first wavelength band:
a first reflection pattern including a first portion facing the plurality of light sources and having a first reflectivity with respect to the light having the first wavelength band, and a second portion disposed adjacent to the first portion and having a second reflectivity with respect to the light having the first wavelength band, and the second reflectivity being lower than the first reflectivity, and
a second reflection pattern disposed between the plurality of light sources and the first reflection pattern, at least partially corresponding to the second portion of the first reflection pattern and having a third reflectivity with respect to the light in the first wavelength band which is higher than the second reflectivity.

17. The stereoscopic reflection pattern of claim 16, wherein the second reflection pattern having a hole therein, and the hole is smaller than the first portion of the first reflection pattern.

18. The stereoscopic reflection pattern of claim 16, wherein the second reflection pattern has one inner end portion which is vertically aligned with an outer end portion of the first portion of the first reflection pattern or is located inside the outer end portion of the first portion of the first reflection pattern.

19. The stereoscopic reflection pattern of claim 16, wherein the second portion of the first reflection pattern includes a film with the first reflectivity with respect to the light having the first wavelength band and the film is disposed partially corresponding to the second portion.

20. The stereoscopic reflection pattern of claim 16, further comprising an adhesive material disposed between the first reflection pattern and the second reflection pattern.

* * * * *